United States Patent [19]
Noland

[11] Patent Number: 4,743,365
[45] Date of Patent: May 10, 1988

[54] VALVE FILTER MECHANISM

[76] Inventor: Wayne B. Noland, 340 Crescent Dr., Carlisle, Iowa 50047

[21] Appl. No.: 898,949

[22] Filed: Aug. 21, 1986

Related U.S. Application Data

[63] Continuation of Ser. No. 769,432, Aug. 26, 1985, abandoned.

[51] Int. Cl.$^4$ .................. B01D 35/02; B01D 35/22
[52] U.S. Cl. .................................. 210/106; 210/122;
210/128; 210/131; 210/354; 210/390; 210/428;
137/547
[58] Field of Search ............... 210/106, 110, 117, 119,
210/122, 123, 128, 131, 354, 390, 429–432, 463,
398; 55/309, 312, 313; 137/547

[56] References Cited

U.S. PATENT DOCUMENTS

| | | | |
|---|---|---|---|
| 3,120,490 | 2/1964 | Samson | 210/409 |
| 3,493,110 | 2/1970 | Rosaen | 210/131 |
| 3,898,063 | 8/1975 | Gazan | 210/131 |

FOREIGN PATENT DOCUMENTS 372606  3/1923  Fed. Rep. of Germany ...... 210/131

Primary Examiner—Richard V. Fisher
Assistant Examiner—Linda S. Evans
Attorney, Agent, or Firm—Henderson & Sturm

[57] ABSTRACT

This invention comprises a valve filter unit (23, 53) comprising a filter (24, 54) the face (25, 55) of which extends angularly to the flow of a fluid medium toward same, and having perforations (26) formed therein; the filter (24, 54) biased by a spring (33, 63) toward a first position wherein the fluid is forced to flow through the filter (24, 54) to remove foreign particles therefrom; said filter (24, 54) movable against the spring (33, 63) in response to additional pressure of the fluid to unseat the filter (24, 54) from its first position engagement with a surface (40, 66) of the conduit (12, 51) within which the filter (24, 54) is mounted, the additional pressure occurring due to a valve (21) downstream from the filter (24, 54) moving away from a closed position with its seat (22) such that the fluid moves quickly past the filter (24, 54) and through the space formed between the filter (24, 54) and the surface (40, 66), thereby cleansing both the filter surface (25, 55) and the mating surfaces of the valve (21) and valve seat (22).

5 Claims, 2 Drawing Sheets

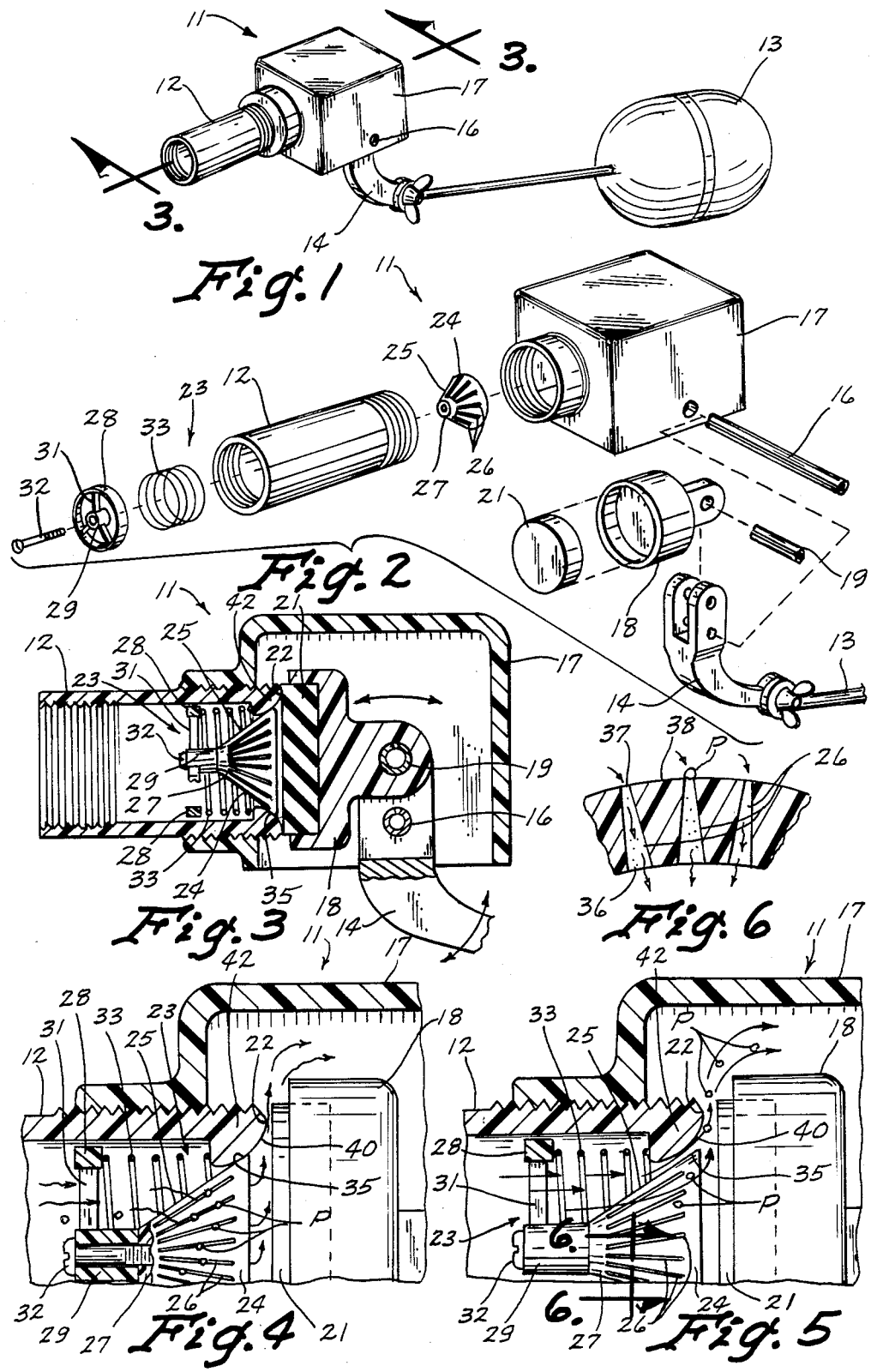

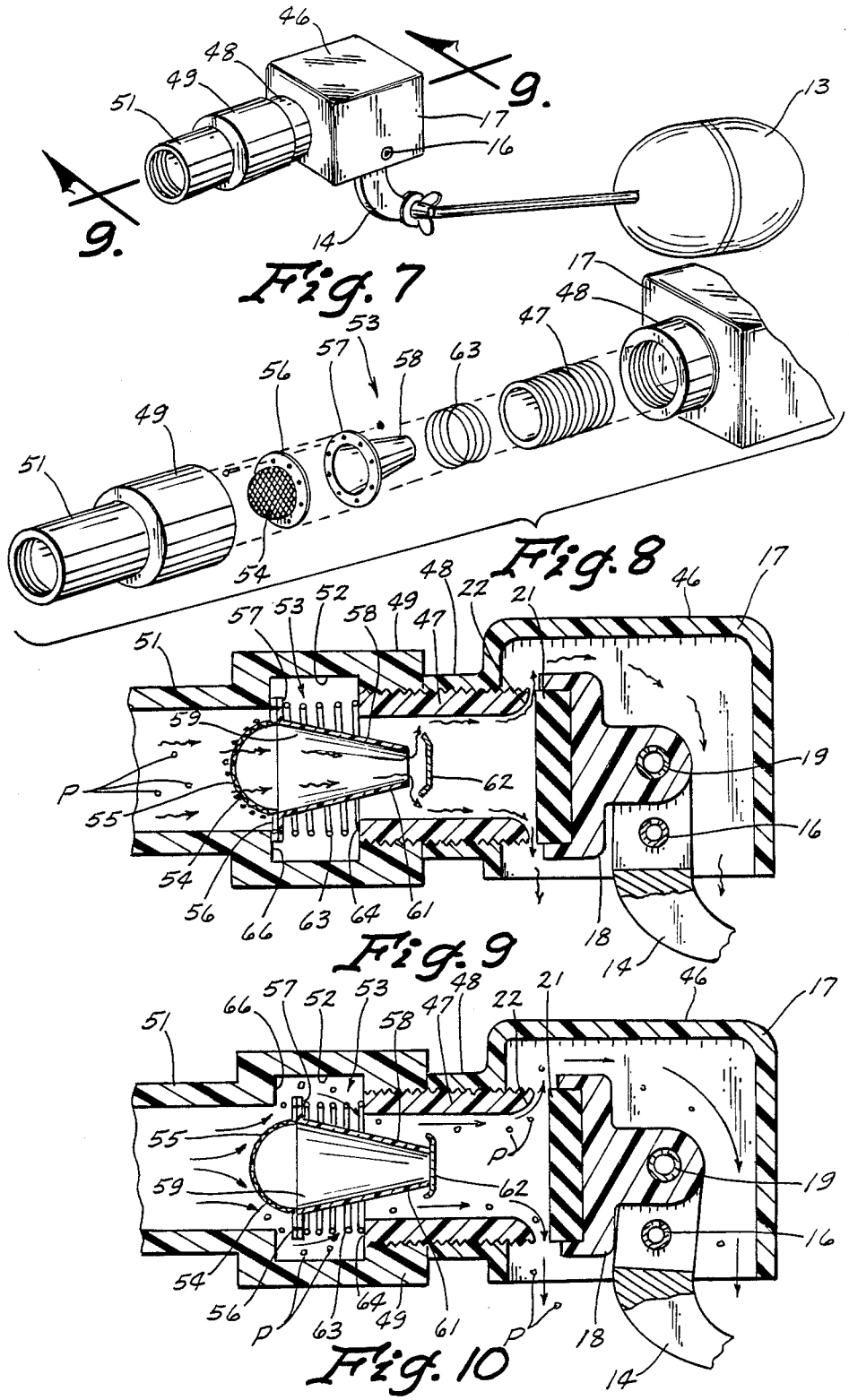

VALVE FILTER MECHANISM

This is a continuation of application Ser. No. 769,432 filed on Aug. 26, 1985, now abandoned.

TECHNICAL FIELD

The present invention relates generally to valves, and more particularly to a filter mechanism for blowing or flushing clean the sealing faces of the valve.

BACKGROUND ART

Valves through which are passed liquids or gases mixed with small solid particles have the disadvantages that owing to the solid particles which tend to deposit on the sealing faces of the valve body and the seat, the valve cannot be properly closed, or in some instances the particles damage the sealing faces of the valve.

Constructions have been proposed which are so designed that the valve faces can be blown or flushed clean by means of an auxiliary gas or liquid. These constructions are, however, usually complicated and expensive. It has also been suggested to incorporate a filter so that the medium is filtered before passing the valve. The latter construction has admittedly the advantage that the clean medium flowing through the valve keeps the valve faces clean, but it has the disadvantage in that it is not intended to affect a blowing or flushing of the ceiling faces to dislodge any particles clinging thereto.

DISCLOSURE OF THE INVENTION

The above problems are substantially resolved, without undue compromise of other desirable attributes that are already provided by prior art devices, by the provision of the invention disclosed herein.

The object of this invention is to provide a valve suitable for use in a line through which a gas or liquid medium, having small solid particles therein, is transported, and in which the sealing faces of the valve of the seat are maintained substantially clean of particles; but wherein should any particles eventually cling to or remain deposited on those sealing faces, the valve mechanism provides a flushing of the sealing faces periodically such as to remove any solid particles therefrom.

As a result of this construction, the valve filter mechanism has a first position wherein when a slow flow of the medium is passing through the valve, the medium will be filtered prior to its passing between the sealing faces such that a clean medium is continuously passing through the valve. A second position of the valve filter mechanism lifts the filter itself off of its seat whereby the filter is virtually bypassed by the medium which effects a blowing or flushing clean of the sealing faces of the valve, and also of the filtering face of the filter.

BRIEF DESCRIPTION OF THE DRAWINGS

These and other attributes of the invention will become more clear upon a thorough study of the following detailed description of the best mode for carrying out the invention, particularly when reviewed in conjunction with the drawings, wherein:

FIG. 1 is a perspective view of this invention, showing the valve filter mechanism inserted in the outlet flow line of a conventional float valve arrangement;.

FIG. 2 is an enlarged exploded view of portions of the valve filter mechanism of FIG. 1;

FIG. 3 is a further enlarged cross sectional view of the valve filter mechanism of this invention as taken along the lines 3—3 in FIG. 1;

FIG. 4 is still a further enlarged sectional view of a portion of FIG. 3, showing the valve filter mechanism of this invention in a "slow flow" position;

FIG. 5 is a view similar to FIG. 4 but showing the valve filter mechanism of this invention in a second "fast flow" condition;

FIG. 6 is an enlarged detail sectional view of the filter as taken along the lines 6—6 in FIG. 5;

FIG. 7 is a perspective view of an alternate embodiment of the valve filter mechanism of this invention;

FIG. 8 is an exploded view of the valve filter mechanism embodiment of FIG. 7;

FIG. 9 is an enlarged cross sectional view of a portion of the alternate embodiment of FIGS. 7 and 8, and showing the valve filter mechanism thereof in one condition; and FIG. 10 is a view similar to FIG. 9 and showing the valve filter mechanism thereof in a second condition.

BEST MODE FOR CARRYING OUT THE INVENTION

Referring now to the drawings, the valve filter mechanism of this invention is depicted generally by the numeral (11). More particularly, the valve filter mechanism (11) is connected to the end of a fluid outlet conduit (12), fluid flowing therethrough into a holding tank (not shown) or the like, the fluid level of which is maintained by means of a conventional float valve (13) secured to a float valve arm (14) which is swingably mounted by means of a pivot (16) to a housing (17).

At the upper end of the float valve arm (14), a valve rocker arm (18) is secured by means of a pin (19), a circular valve (21) of rubber or the like mounted to the face of the valve rocker arm (18) for engagement with the seat portion (22) at the outer end of the outlet conduit (12). The valve filter (23) of this invention is moveably mounted within the outlet conduit (12) and comprises a cone-shaped filter (24) which has a plurality of silts or perforations (26) formed therein. It will be noted that the perforations (26) extend substantially parallel to the direction of flow of the fluid within the conduit (12), and that the face (25) of the filter is disposed at about a forty-five degree angle to the direction of flow of the fluid within the conduit (12), as compared to being either normal to the flow or opposed thereto.

The valve filter (23) includes further an internally threaded end (27) at its leading end, a circular collar (28) having a center bore (29) connected by spokes (31) to the outer rim of the collar (28), and with a connector (32) being provided for connecting the collar (28) and the filter (24) together as best illustrated in FIGS. 4 and 5. A spring (33) is placed between the collar (28) and an internal shoulder of the valve seat (22) of the conduit (12), with the normal bias of the spring (33) tending to force the valve filter unit (23) into a position best illustrated in FIG. 4 where the downstream peripheral portion (35) of the filter (24) engages a mating surface (40) of the seat (22) so as to prevent the flow of fluid therebetween.

Referring to FIG. 6, it is seen that the perforations (26) have V-shaped passages (36) formed within the filter (24), which passages (36) have small entrances (37) at the upstream face (38) of the filter (24), with the outlet ends at the downstream interior surface of the filter (24) being larger than the entrances (37).

The valve filter mechanism (11) operates as follows: when the fluid level of the container (not shown) as maintained by the float valve (13) is in a normal condition, the position of the float valve arm (14) and the valve rocker arm (18) (FIG. 3) maintains the valve (21) firmly engaged with the seat (22) such that fluid does not flow from the conduit (12) outwardly and into the housing (17) for discharge therebelow. Further in this closed condition of the valve, the bias of the spring (33) between the internal shoulder of the conduit seat (22) and the collar (28) of the valve filter unit (23) is such as to maintain the peripheral portion (35) of the filter (24) firmly engaged with its mating surface (40) on the outlet end (42) of the conduit (12) (FIG. 3).

Upon the level of the fluid (not shown) being reduced slightly, as by cattle feeding therefrom, a lowering of the float valve (13) will effect a slight spacing of the valve (21) from the seat (22). Thus, fluid in the conduit (12) flows through the perforations (26) from the inlet or entrance (37) ends to the outlet ends (FIG. 6) such that the fluid continues to flow through the filter (24) and outwardly of the conduit end (42) and into the housing (17) as indicated by the arrows in FIG. 4. This "slow flow" of the fluid in the conduit (12) effects a filtered flow of the fluid, any particles within the fluid building up on the face (25) of the filter (24) as is shown by the letter P indicating the particles, in FIG. 4.

Further lowering of the fluid within the container (not shown) results in a further lowering of the float valve (13) such that the pivoting action of its arm (14) affects an additional outward or clockwise movement of the rocker arm (18) as seen in FIG. 3, such that the valve (21) moves even further away from its seat (22) as best illustrated in FIG. 5. Thus, a "fast flow" condition of the parts results due to the continued pressure of the fluid within the conduit (12) now forcing the filter (24) against the bias of the spring (33) such that the entire valve filter unit (23) moves to the right as viewed in FIG. 5, and whereby the spacing between the peripheral portion (35) of the filter (24) and the surface (40) of the end (42) is even greater. This permits a flushing of the fluid off both the face (25) of the filter and the sealing surfaces of the valve (21) and the seat (22), whereby any solid particles which have been clinging to or deposited on any of those surfaces are cleared away. This "fast flow" action thus maintains the face (25) of the filter (24) clean, and also maintains clean the faces of the valve (21) and seat (22) which are normally engaged when the valve filter mechanism is in the closed position of FIG. 3.

As the fluid continues the flow into the container (not shown) such that the float valve (13) is raised, this action effects a complete closing of all of the valve surfaces placing the valve filter mechanism (11) in the condition best shown in FIG. 3.

Referring now to FIGS. 7–10 inclusive, an alternate embodiment of the invention as shown in FIGS. 1–6 inclusive is depicted, with like reference numerals indicating like elements.

The valve filter mechanism (46) is shown placed in combination with the same float valve (13) and other structure including arm (14), pivot (16), housing (17), rocker arm (18), pin (19) and valve (21) as is shown in the embodiment of FIGS. 1–6.

Substituting for the conduit (12) is an externally threaded pipe (47) threaded into the entrance end (48) of the housing (17), and which pipe (47) includes the seat portion (22) at its innermost end. The other end of the pipe (47) is placed in threaded engagement with an end (49) of a tube (51) within which is formed a chamber (52) within which the valve filter unit (53) of this particular embodiment is mounted.

The filter unit (53) comprises a semi-circularly shaped filter (54) having a plurality of perforations formed therein and with a curved surface (55) primarily angularly related to the flow of fluid through the tube (51) and toward the filter (54). Additionally, the filter unit (53) comprises a flange (56) for the filter (54) which mates with another flange (57) of an elongated cone (58) having an enlarged inlet end (59) adjacent the filter (54), with a small outlet end (61) normally spaced upstream from a plate (62) which is mounted in a stationary manner within the pipe (47). Additionally, the filter unit (53) includes a spring (63) which is mounted between the flange (57) and a shoulder (64) at the inlet end of the pipe (47).

In operation, the normal position or condition of the valve filter unit (53) is illustrated in FIG. 8, wherein the bias of the spring (63) forces the flanges (56) and (57) of the unit up against the shoulder (66) formed on the inlet side of the chamber (52) when the valve (21) is engaged with the seat (22) whereby no water is flowing, no action of course occurs; however, upon a slight downward movement of the float valve (13) to break the valve (21) away from the seat (22) such that fluid can flow therebetween and into and out of the housing, fluid passes through the perforations of the filter (54), into the interior of the cone (58) and moves from the inlet end (59) to and through the outlet end (61) whereupon it impinges against the plate (62), and thence flows on outwardly of the pipe (47). Any solid particles within the fluid are caught on the surface (55) of the filter (54), thus making certain that such particles do no breach either the valve (21) or the seat (22) so as to cling thereto and create leaking problems at a subsequent time.

Further downward movement of the float valve (13) affects a larger opening between the valve (21) and the seat (22) as is shown in FIG. 10, such that the additional pressure of the fluid upon the face (55) of the filter (54) forces the filter (54) via the flanges (56) and (57) to the right as viewed in FIG. 10, thus opening a substantial gap between the filter (55) and the shoulder (66) of the tube (51). This enables a flushing of particles from the face surface (55) of the filter (54), which particles, indicated at P in both FIGS. 9 and 10, and then flushed away from the filter face (55), on the outer side of the cone (58) as indicated in FIG. 10, and on past the respective faces of the valve (21) and (22), thereby further cleansing and sweeping away the particles which might have lodged on those two portions, (21) and (22), of the valve arrangement. Upon a raising movement of the float valve (13), the valve (21) and seat (22) are closed together such that with the flow of fluid through the tube (51) halted, in effect, the bias of the spring (63) forces the filter flange (56) back up against the shoulder (66) of the tube (51), whereby the valve filter unit (53) is again placed in condition for filtering any fluid which passes toward the valve (21) and seat (22) during the "slow flow" of the fluid medium which occurs at the initial stage of opening of the valve and seat, (21) and (22) respectively.

The valve and its alternative embodiment according to this invention can be used in lines through which are transported any gases or liquids in which solid particles are possibly present; and although the particular valve and modification thereof of this invention are shown utilized in a conventional float valve arrangement, it is readily understood that his invention may also be advantageously used in any lines or conduits for numerous other arrangements where solid particles are or may be present in a fluid stream.

I claim:

1. A fluid filter mechanism comprising:

a conduit for permitting fluid to flow therethrough in one direction, said conduit having means defining an inlet and means defining an outlet:

a valve seat disposed in said conduit between the inlet and the outlet;

a filter member having a sealing surface thereon reciprocally disposed in said conduit and having a first position in sealing contact with said valve seat and a second position spaced from said valve seat for permitting fluid flow from the inlet to the outlet around said filter member when said filter member is in the second position thereof;

means for biasing said filter member in an upstream direction to said first position thereof whereby the sealing surface thereon would be in sealing contact with said valve seat;

filter means disposed on an upstream portion of said filter member for permitting fluid to flow through said filter member to said outlet when said filter member is in the first position thereof when the flow of fluid through the conduit is slow for holding solid particles in the fluid on the upstream portion of said filter means, said filter means being disposed upstream of the sealing surface on said filter member whereby when the flow of fluid through the conduit is increased, the differential pressure across the filter member and filter means will move the filter member and filter means to the second position thereof to cause more flow along and around the filter means than through it, whereby the solid particles will be flushed off of said filter means during such increased flow conditions;

flow control valve means connected to said conduit downstream from said filter member for regulating the flow through said conduit, said valve means including a valve member, said valve member having a closed position against said valve seat, a completely open position spaced a predetermined distance from said valve seat and a partially open position being spaced a distance from said valve seat but less than said predetermined distance from said valve seat; and float means for controlling the position of said flow control valve means depending upon the level of the float means.

2. The fluid filter mechanism of claim 1 wherein said filter means is gradually larger from the upstream end thereof to the downstream end thereof to enhance self cleaning of the filter means during fast flow conditions when the filter member is in said second position thereof.

3. The fluid filter mechanism of claim 2 wherein said filter means is frusto-conical in shape.

4. The fluid filter mechanism of claim 3 wherein the sealing surface of the filter member is integral with said filter means and is on the outer downstream said thereof.

5. A fluid filter mechanism comprising:

a conduit for permitting fluid to flow therethrough in one direction, said conduit having means defining an inlet and means defining an outlet;

a valve seat disposed in said conduit between the inlet and the outlet;

a filter member having a sealing surface thereon reciprocally disposed in said conduit and having a first position in sealing contact with said valve seat and a second position spaced from said valve seat for permitting fluid flow from the inlet to the outlet around said filter member when said filter member is in the second position thereof;

means for biasing said filter member in an upstream direction to said first position thereof whereby the sealing surface thereon would be in sealing contact with said valve seat;

filter means disposed on an upstream portion of said filter member for permitting fluid to flow through said filter member to said outlet when said filter member is in the first position thereof when the flow of fluid through the conduit is slow for holding solid particles in the fluid on the upstream portion of said filter means, said filter means being disposed upstream of the sealing surface on said filter member whereby when the flow of fluid through the conduit is increased, the differential pressure across the filter member and filter means will move the filter member and filter means to the second position thereof to cause more flow along and around the filter means than through it, whereby the solid particles will be flushed off of said filter means during such increased flow conditions;

flow control valve means connected to said conduit downstream from said filter member for regulating the flow through said conduit, said valve means including a valve member, said valve member having a closed position against said valve seat, a completely open position spaced a predetermined distance from said valve seat and a partially open position being spaced a distance from said valve seat but less than said predetermined distance from said valve seat;

float means for controlling the position of said flow control valve means depending upon the level of the float means;

a second valve seat disposed co-axially within said conduit downstream of the first said valve seat; and a frustro-conical megaphone-shaped member having solid fluid impermeable walls attached at the large end to said filter member and having the smaller downstream end engageable with said second valve seat whereby once the filter member and filter means moves to the second position thereof, the smaller downstream end of said megaphone-shaped member will seal against the second valve seat to substantially prevent flow through the filter means and cause the flow to pass over the filter means to automatically clean it.

* * * * *